Oct. 9, 1923.  
H M. SPECHT  
VEHICLE WHEEL  
Filed Aug. 14, 1922   2 Sheets-Sheet 2
1,470,333
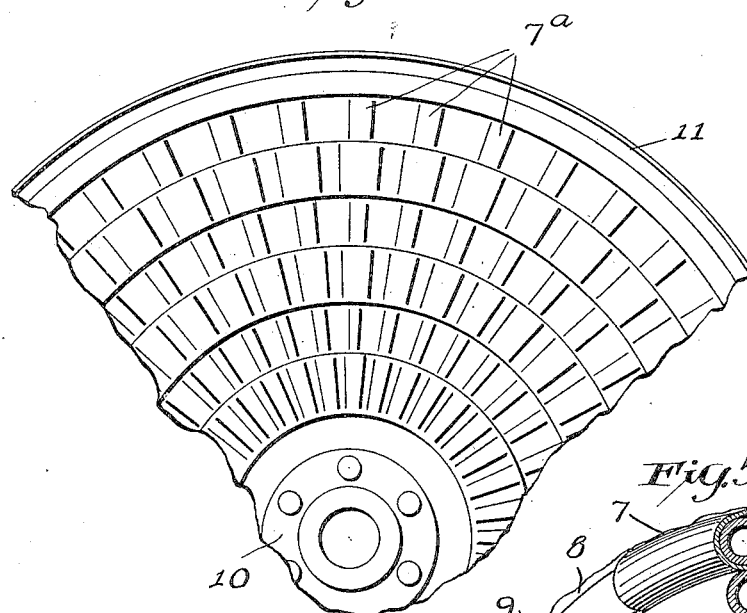
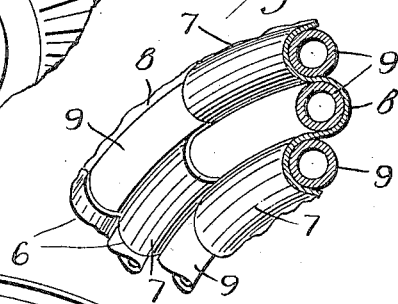
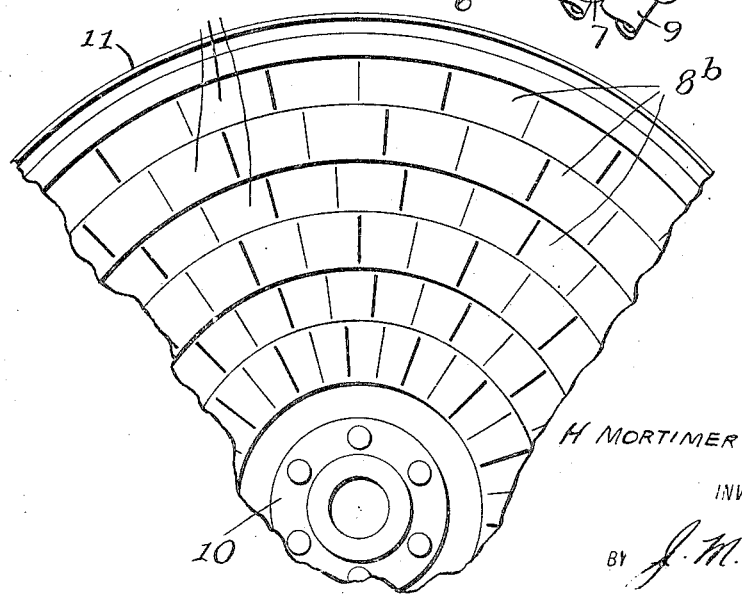
H MORTIMER SPECHT  
INVENTOR  
BY J. M. Wilson  
ATTORNEY Patented Oct. 9, 1923.

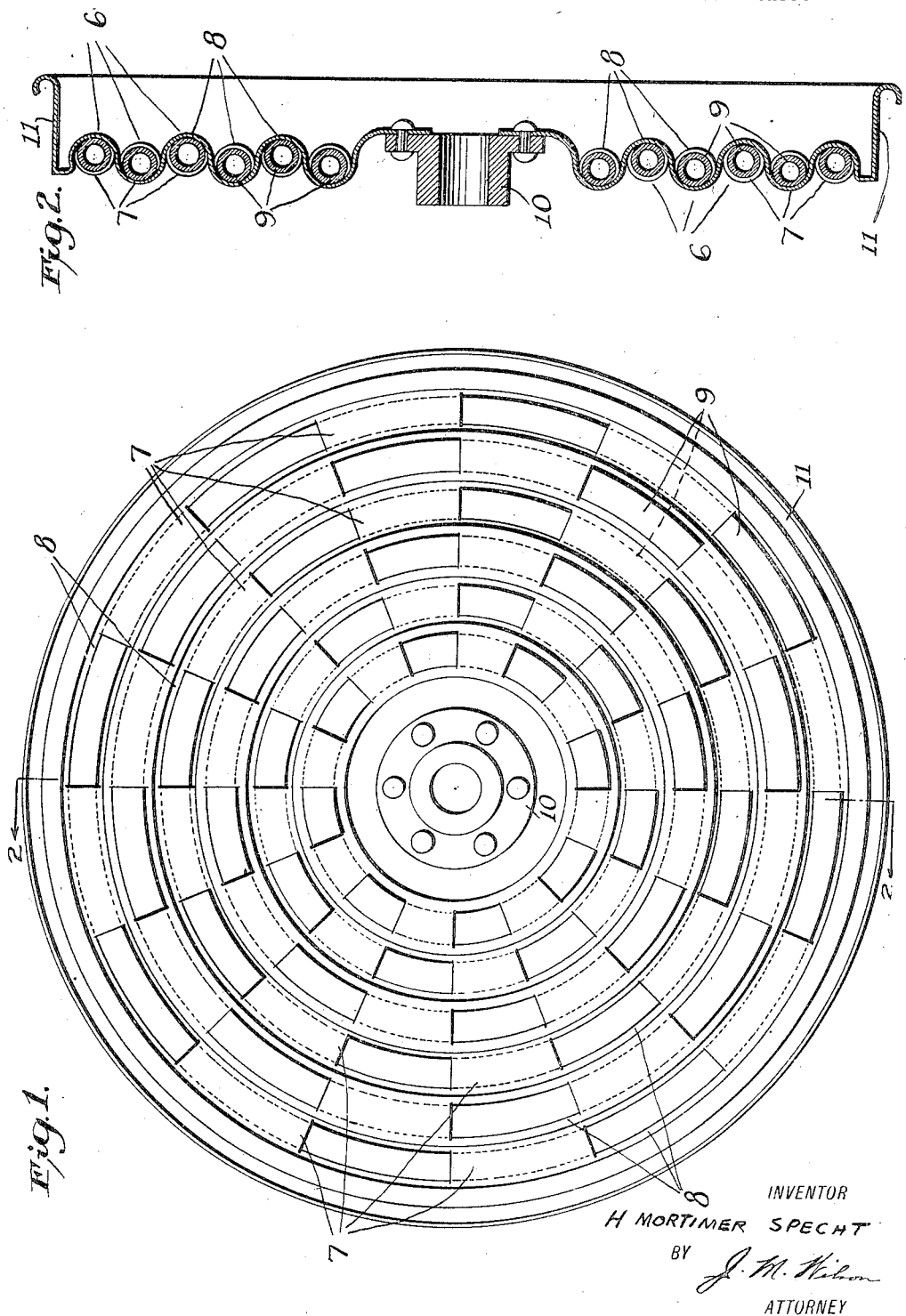

1,470,333

UNITED STATES PATENT OFFICE.

HARRY MORTIMER SPECHT, OF PELHAM, NEW YORK.

VEHICLE WHEEL.

Application filed August 14, 1922. Serial No. 581,697.

*To all whom it may concern:*

Be it known that I, HARRY MORTIMER SPECHT, a citizen of the United States, and a resident of Pelham, county of Westchester, State of New York, have invented a new and useful Improvement in a Vehicle Wheel, of which the following is a specification.

This invention relates to vehicle wheels, and particularly to the type known as disk wheels, which have been found to be of great practical value on motor driven vehicles especially.

My device provides by reason of its construction, a structure that is light in weight and at the same time possessed of a strength and rigidity that will enable it to withstand the stresses and strains inevitably to be met with in driving.

As a light weight of metal can be used, and the number of operations thereon can be reduced to a minimum, the cost of production will be low and the device can be made and sold upon an economical basis. If steel is used, the structure may be tempered if it is desired.

An important feature in this invention is the method of forming the concentric, circumferential corrugations referred to so that they present alternately a concave and convex surface on either side of the disk, and produce in effect a sort of channel or tube through which may be threaded or inserted a rod or tubing or similar device to reinforce the structure and thereby permit the use of a light weight metal for the disk. This construction also serves to provide a much increased resilience.

I have also found that the width of the corrugations, or the diameter of the channel or tube formed by the alternate convexing or concaving thereof can be varied to advantage to meet special requirements, and that this principle applies also to the length of the said convex and concave surfaces and the relative positioning thereof in the adjacent concentric corrugations.

As shown the usual forms of demountable rims and hubs can be used to permit of the speedy and convenient changing of tires and wheels when desired.

In the drawings herewith:—

Fig. 1 is a front elevation.

Fig. 2 is a sectional view on the line 2—2 of Figure 1.

Fig. 3 is a fragmentary elevation of a modified form of the device showing sections of the corrugations in staggered relation to one another.

Fig. 4 is a fragmentary elevation of another modification of the same nature.

Fig. 5 is a fragmentary detail perspective view of a section of the disk member of the wheel.

In all the views herewith the reference numeral 6 designates the circumferential concentric corrugations provided in the disk member which surrounds the hub of the wheel and carries upon its periphery the rim upon which the tire is supported.

These corrugations are divided into longitudinal sections 7 and 8, alternately elevated or depressed with relation to the plane of the surface of the disk proper, thereby producing a channel or tube which imparts strength and resilience to the structure. If further strength or reinforcement is desired, strips, tubes or rods 9 of the proper material may be inserted and threaded through the said channels or tubes. It would also be practicable to cut out completely and remove from the disk member, enough of these longitudinal sections to reduce the weight of the wheel without unduly weakening the structure.

This plastic mass as it is poured into the mold would flow into and fill up all the open spaces in the metal disk member and the corrugations therein, and thereby practically a monolithic wheel strongly reinforced by the metal disk construction would be obtained.

This form would be of particular value for use on heavy vehicles such as trucks or tractors.

A hub 10 of any usual form may be secured in the usual way at the centre of the disk, and on the periphery thereof a rim 11 of any desired shape may be secured.

As shown in Fig. 3, the convexed sections 7$^a$ of the corrugations are short in length and therefore increased in number and formed in staggered relation to the longitudinal sections in the adjacent corrugations.

In Fig. 4, the convex and concave sections 7$^b$ and 8$^b$ are shown in another modified form.

As is obvious, in Fig. 3 and Fig. 4 the reinforcing members 9 are not shown, as it may not be necessary or desirable under some conditions to use same.

It has been found practical to use pressed steel in forming the said disk member and to punch out the corrugations divided longitudinally into the convex and concave sections but in addition there are other metals which may be used some of which could be cast or molded to secure the indicated construction.

I do not desire to limit myself strictly to the preferred form of my invention shown herewith as there are other forms within the scope and breadth thereof.

I claim:—

1. In a vehicle wheel, a disk member adapted to be positioned between the hub and the rim of the wheel, a plurality of circumferential concentric corrugations upon the surfaces of the said disk member, the said corrugations being alternately convexed and concaved with relation to the plane of the surfaces of the said disk member, and reinforcing members adapted to be inserted and positioned in the channels formed by the said concaved and convexed sections of the said circumferential corrugations.

2. In a vehicle wheel, a disk member adapted to be positioned between the hub and the rim of the wheel, a plurality of circumferential concentric corrugations upon the surfaces of the said disk member, the said corrugations being divided into longitudinal sections alternately elevated and depressed with relation to the plane of the surface of the said disk member.

3. In a vehicle wheel, a disk member adapted to be positioned between the hub and the rim of the wheel, a plurality of circumferential concentric corrugations upon the surfaces of the said disk member, the said corrugations being divided into longitudinal sections alternately elevated and depressed with relation to the plane of the surface of the said disk member and reinforcing members adapted to be inserted and positioned in the channels formed by the said elevated and depressed sections of the said circumferential corrugations.

4. In a vehicle wheel, a disk member adapted to be positioned between the hub and the rim of the wheel, a plurality of circumferential concentric corrugations upon the surfaces of the said disk member, the said corrugations being divided into longitudinal sections alternately elevated and depressed with relation to the plane of the surface of the said disk member, the said sections being formed in staggered relation to one another in the said circumferential concentric corrugations.

5. In a vehicle wheel, the combination with a hub and rim, of a disk member provided with a plurality of circumferential concentric corrugations divided longitudinally into sections alternately elevated and depressed with relation to the plane of the surface of the said disk member.

6. In a vehicle wheel, the combination with a hub and rim, of a disk member provided with a plurality of circumferential concentric corrugations divided longitudinally into sections alternately elevated and depressed with relation to the plane of the surface of the said disk member, and reinforcing members adapted to be inserted and positioned in the channels formed by the said elevated and depressed sections of the said circumferential corrugations.

H. MORTIMER SPECHT.

Witnesses:
 WM. A. TIEDEMANN,
 A. M. CARAMORE.